United States Patent [19]

Orii et al.

[11] Patent Number: 4,887,307

[45] Date of Patent: Dec. 12, 1989

[54] SPEED CONTROL APPARATUS FOR ELECTRIC MOTOR

[75] Inventors: Akira Orii; Takashi Nakamura, both of Tokyo, Japan

[73] Assignee: Janome Sewing Machine Co., Ltd., Tokyo, Japan

[21] Appl. No.: 162,867

[22] Filed: Mar. 2, 1988

[30] Foreign Application Priority Data

Mar. 6, 1987 [JP] Japan ................................. 62-49916

[51] Int. Cl.$^4$ ............................................... G05B 5/00
[52] U.S. Cl. ..................................... 388/810; 388/815; 388/912; 318/465
[58] Field of Search ................................ 318/306–318, 318/600–603, 449, 450, 461–465; 388/800–802, 803–806, 809–810, 815, 912

[56] References Cited

U.S. PATENT DOCUMENTS

| | | | |
|---|---|---|---|
| 4,323,833 | 4/1982 | Watanabe et al. | 318/376 |
| 4,331,890 | 5/1982 | Makino et al. | 112/277 |
| 4,403,560 | 9/1983 | Makabe et al. | 112/454 |
| 4,417,188 | 11/1983 | Makabe et al. | 318/696 |
| 4,456,859 | 6/1984 | Watanabe et al. | 318/345 C |
| 4,480,561 | 12/1984 | Makabe et al. | 112/445 |

Primary Examiner—William M. Shoop, Jr.
Assistant Examiner—David Martin
Attorney, Agent, or Firm—Michael J. Striker

[57] ABSTRACT

A speed control device for an electric motor having a rotation speed and driven by a power source and including components for producing a counter value from the rotation speed of the motor, components for comparing the counter value produced from the producing components with a predetermined counter value of a designated speed and producing a deviation output counter value, components for integrating the deviation output for a predetermined period of time including a first integrating circuit for multiplying the deviation output by a predetermined value and producing a resultant and a second integrating circuit for adding a predetermined value to the resultant of the first integrating circuit and producing a resultant, and components for adding said second integrating circuit resultant to the deviation output of the comparator means so as to change the deviation output resultant counter value to a time value for controlling the motor driving power source.

3 Claims, 5 Drawing Sheets

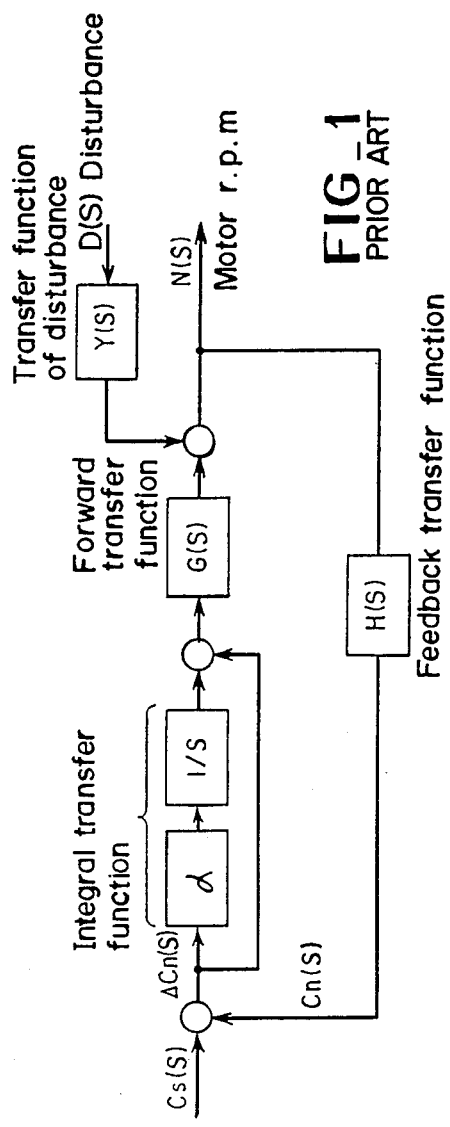
FIG_1 PRIOR ART
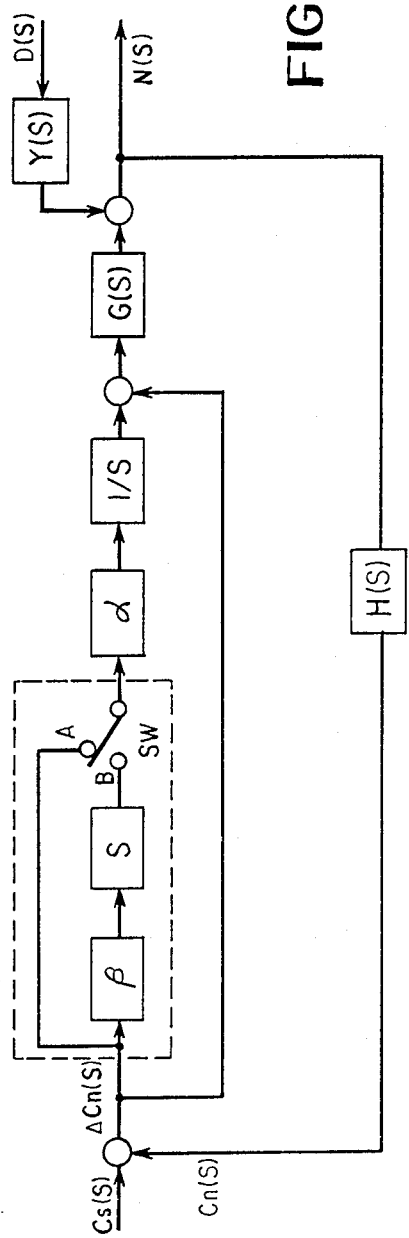
FIG_3

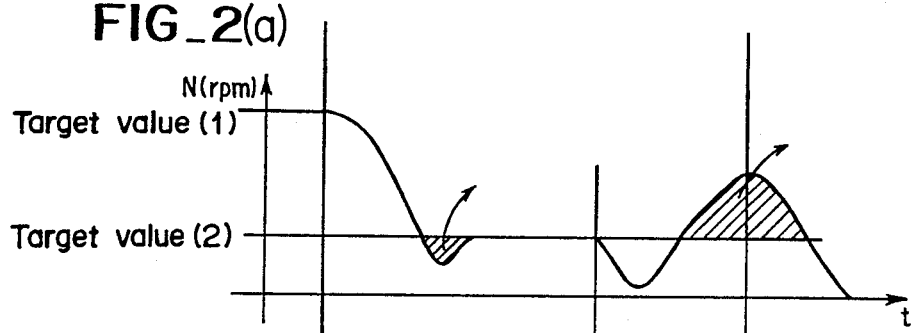
FIG_2(a)
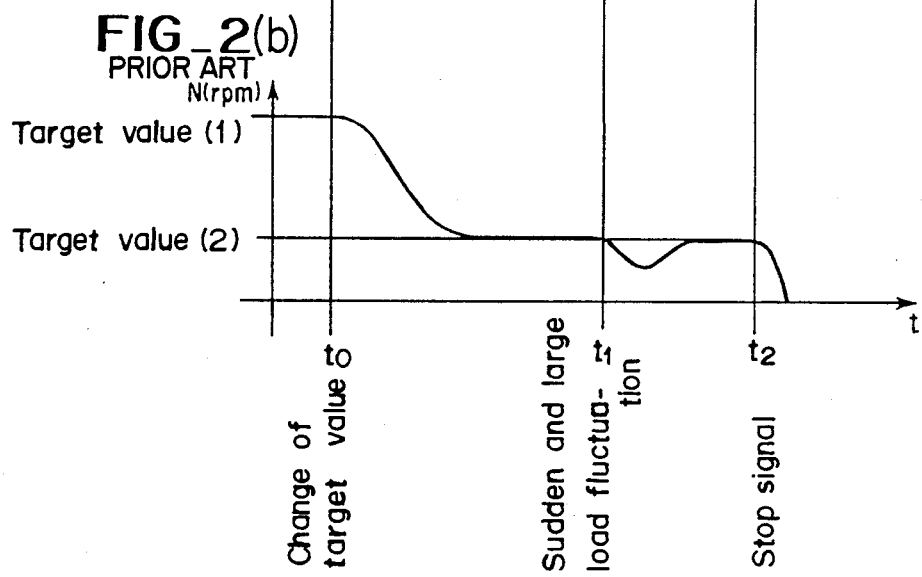
FIG_2(b) PRIOR ART

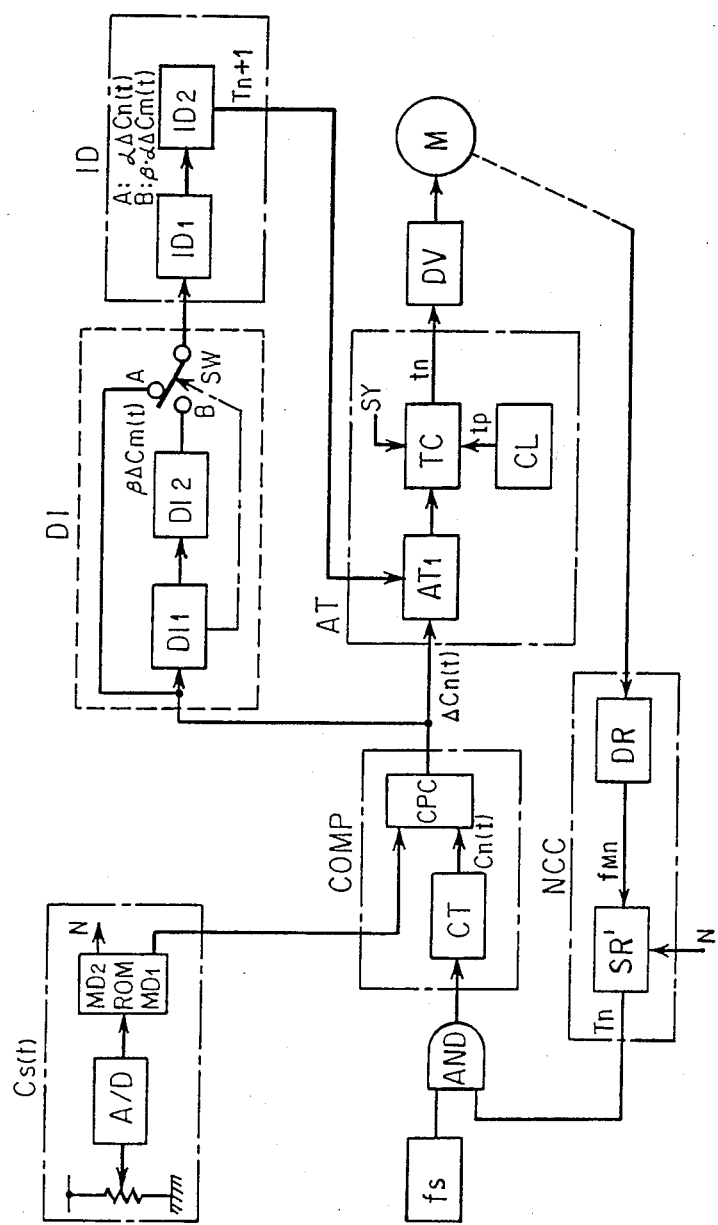
FIG_4

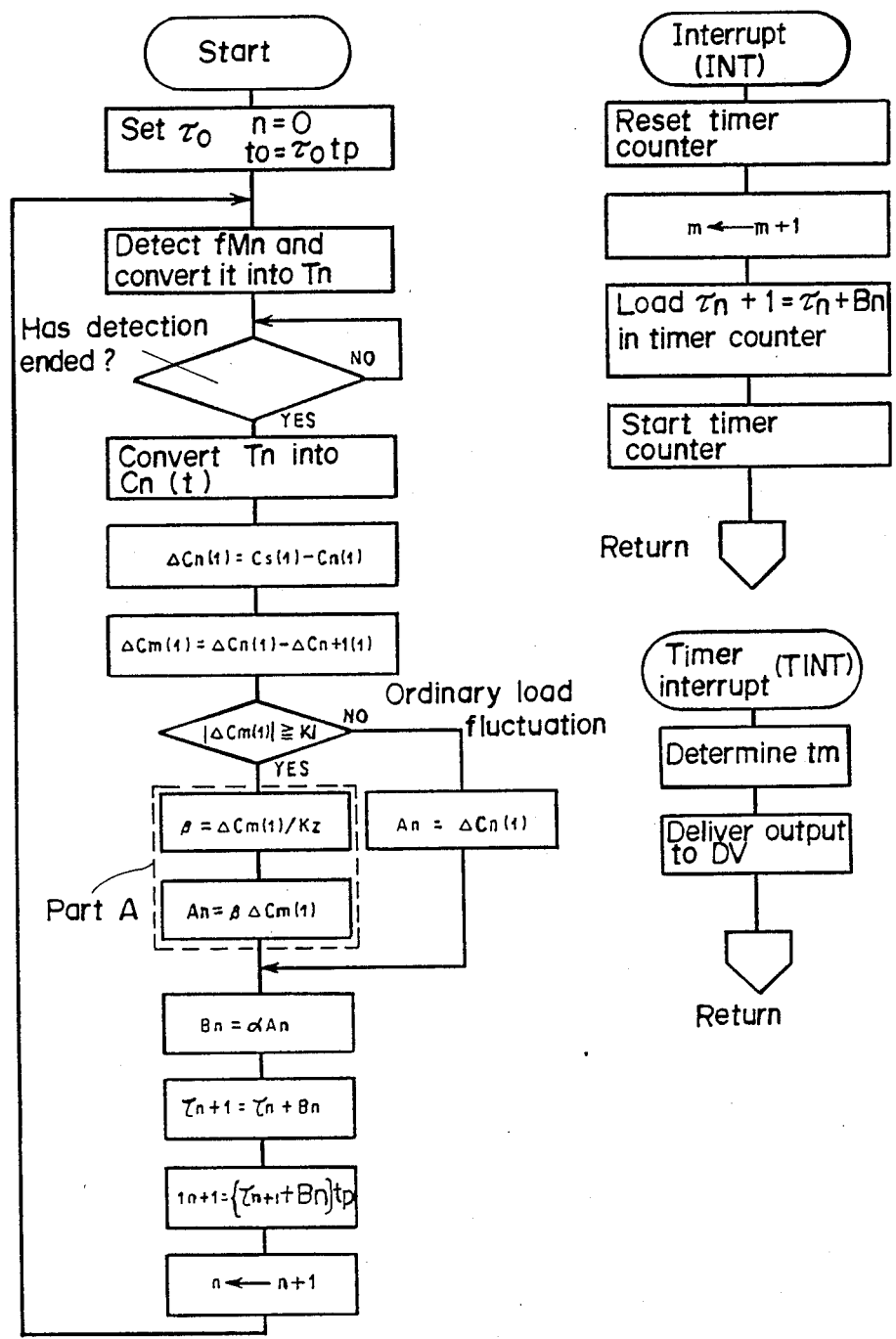
FIG_5

FIG_6(a)
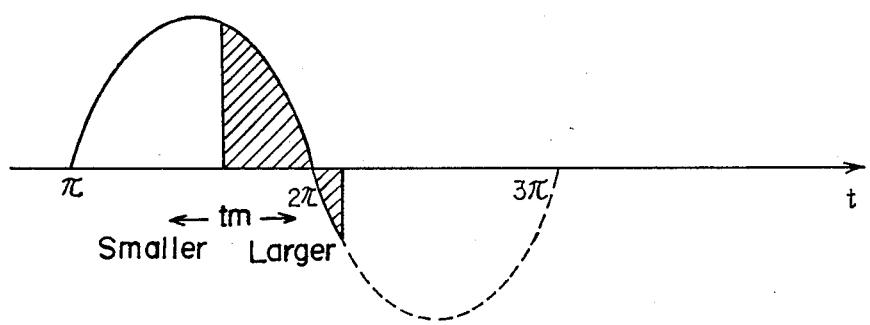
FIG_6(b)
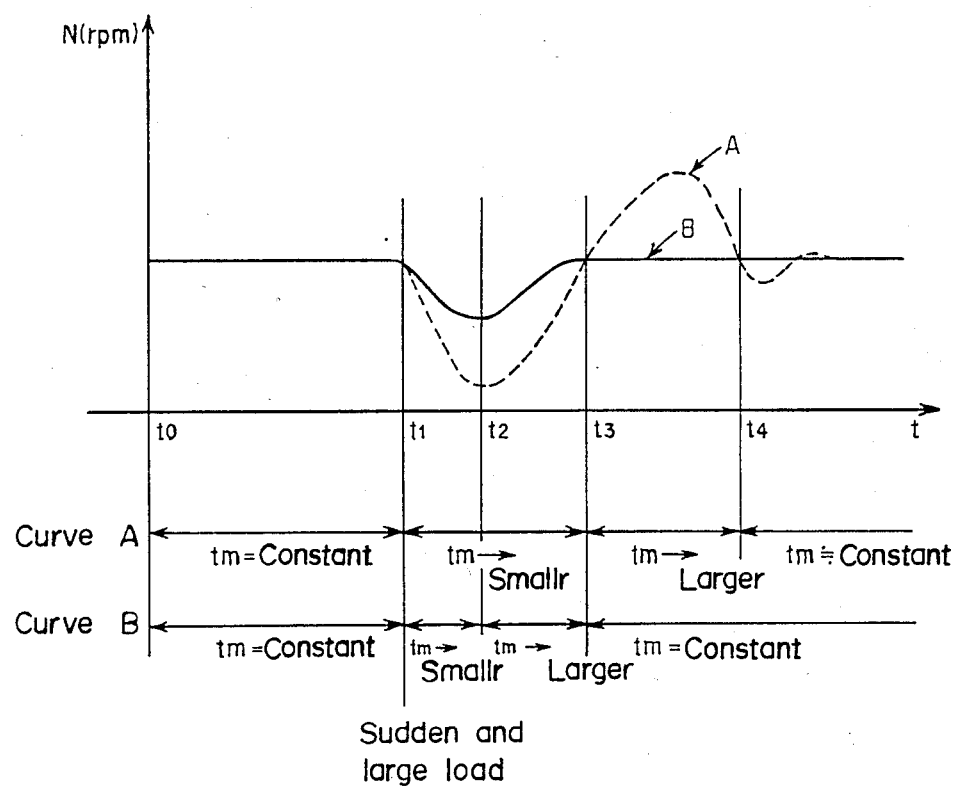

SPEED CONTROL APPARATUS FOR ELECTRIC MOTOR

BACKGROUND OF THE INVENTION

The present invention relates to an electric motor of wide variable speed range and large load fluctuation, and a control system for such a motor.

A speed control apparatus for an electric motor is known from the laid open Japanese Patent Application No. 193986/1982 assigned to the same assignee, and, is shown in FIG. 1. This apparatus has the function of making a steady-state error ($\Delta C_n$) equal to zero with a comparatively simple arrangement.

Referring to FIG. 1, Cs(S) indicates the desired r.p.m. of the motor N(S) the control value for determining the r.p.m. of the motor, G(S) the forward transfer function of the control system, D(S) a disturbance to the system, Y(S) the transfer function of the disturbance, and H(S) the feedback transfer function. Blocks $\alpha$ and 1/S indicate an integral transfer function. Then, the following holds:

$$N(S) = G(S)(1 + \alpha/S) \Delta C_n(S) + Y(S) D(S) \quad (1)$$

$$C_n(S) = H(S) N(S) \quad (2)$$

$$\Delta C_n(S) = C_s(S) - C_n(S) \quad (3)$$

From Eqs. (1), (2) and (3), the steady-state error $\Delta C_n$ becomes:

$$\begin{aligned}\Delta C_n &= \lim_{s \to 0} S \Delta C_n(S) \\ &= \lim_{s \to 0} \frac{S \cdot C_s}{S + (S + \alpha) G(S) H(S)} - \\ &\quad \frac{S \cdot H(S) Y(S) d}{S + (S + \alpha) G(S) H(S)} \\ &= 0\end{aligned} \quad (4)$$

where $C_s(S) = C_s/S$ and $D(S) = d/S$. Thus, the steady-state error $\Delta C_n$ (hereinafter, termed the "r.p.m. fluctuation") can be made zero.

It is accordingly possible to eliminate r.p.m. fluctuations ascribable to:

(1) dispersion in the load of a mass-produced product,
(2) dispersion in a motor output,
(3) voltage fluctuation, and
(4) power source frequency fluctuation (especially, the difference of frequencies in 50 Hz and 60 Hz zones).

As shown by a hatched part I in FIG. 2(a), however, when the target value (1) of the motor r.p.m. has changed abruptly to a lower target value (2); for a certain time interval the r.p.m. becomes too small due to a slow resonse of the control system.

Besides, in a case where the motor is to be stopped at a predetermined position, it is first set to operate at a low speed, and subsequently performs a stopping operation. However, when a sudden and large load fluctuation occurs during the low speed operation, the r.p.m. becomes too great as shown by a hatched part II in FIG. 2(a), and a stop position can shift widely.

SUMMARY OF THE INVENTION

The present invention has been made to solve the problems mentioned above, and has for its object to provide with a comparatively simple arrangement a control apparatus whose response to a sudden and large load is quickened, as shown in FIG. 2(b).

According to the present invention, a part enclosed with a broken line in FIG. 3 is added to the prior-art apparatus. The broken-line part is realized by a differential transfer function and a switch SW which operates according to the variation of the error or offset $\Delta C_n(S)$.

Thus, when the sudden and large load fluctuation has developed, the error $\Delta C_n(S)$ reaches a certain value, and the switch SW is changed-over from a contact A to a contact B. Then, the following holds:

$$N(S) = G(S)(1 + \beta\alpha)\Delta C_n(S) + Y(S)D(S) \quad (5)$$

$$C_n(S) = H(S)N(S) \quad (6)$$

$$\Delta C_n(S) = C_s(S) - C_n(S) \quad (7)$$

On the basis of Eqs. (5), (6) and (7), the motor is controlled according to a function:

$$\Delta C_n(S) = \frac{C_s(S)}{1 + (1 + \beta\alpha) G(S) H(S)} + \frac{H(S) Y(S) D(S)}{1 + (1 + \beta\alpha) G(S) H(S)} \quad (8)$$

In due course, the error $\Delta C_n(S)$ becomes less than the certain value, and the switch SW is changed-over from the contact B to the contact A.

Thus, the same arrangement as in FIG. 1 is established, and the control of making the r.p.m. fluctuation zero is conducted according to Eq. (4):

$$\begin{aligned}\Delta C_n &= \lim_{s \to 0} S \Delta C_n(S) \\ &= 0\end{aligned} \quad (4)$$

As stated above, the present invention can attain characteristics of good controllabilities against the abrupt target-value change and the sudden and large load fluctuation as illustrated in FIG. 2(b) and is also capable of making the r.p.m. fluctuation equal to zero.

BRIEF DESCRIPTION OF THE DRAWINGS

FIG. 1 is a block diagram of a prior speed control apparatus for an electric motor as proposed in the Japanese patent publication No. 193986/1982.

FIG. 2(a) is a speed change diagram in the case of the prior art apparatus where, besides the abrupt change of the target speed value, a load has fluctuated suddenly before a stopping operation; FIG. 2(b) is a speed change diagram in the case of the present invention where errors shown by hatched areas in FIG. 2(a) are improved;

FIG. 3 is a block diagram of a speed control apparatus for an electric motor according to the present invention;

FIG. 4 is a block diagram showing a more detailed embodiment of a control system incorporating the prior art apparatus of FIG. 1 and the speed control apparatus of the invention;

FIG. 5 is a flow chart for explaining the control system of FIG. 4; and

FIGS. 6(a) and 6(b) are time diagrams for comparing the controllabilities of the prior-art apparatus in FIG. 1 with those of the apparatus of the present invention.

DETAILED DESCRIPTION OF THE INVENTION

The present invention consists in that the prior art "speed control apparatus for an electric motor disclosed in Japanese Patent Application Laid-open No. 193986/1982" is additionally equipped with a differential unit DI a broken-line portion DI as shown in FIG. 4.

In FIG. 4, block ID denotes an error integrator, block AT denotes a triggering time calculator, block COMP indicates a comparator, and block NCC indicates a unit for converting the rotating speed or r.p.m. of the motor with a count value. These blocks except the block DI are known from the prior art, M is a motor, and in the instant example, a universal motor is employed. (DR) is a rotation detector for detecting frequency $f_{Mn}$ in proportion to the rotation speed of the motor and which issues 100 pulses per one rotation. (SR) is a rotation period calculator which obtains period $T_n = 1/f_{Mn}$ by calculation, and renews a suffix n of Tn per each of periods (second) to issue a signal of theoretical value 1. AND gate receives at one input thereof the theoretical signal for the period Tn, and at the other input receives signal fs of a standard oscillator which oscillates $2 \times 10^4$ pulse/second. The signal $fs >> f_{Mn}$. The AND gate passes the signal fs for the period Tn, closes instantaneously and repeats it. This signal at the output of AND gate corresponds to the signal Cn(t) at the output of the feed back H(s) in FIG. 1. (COMP) is a comparator, one input of which receives the output Cn(t) from the AND gate and renews each time the AND gate closes. The other input of (COMP) receives a set count value Cs(t) which is a determined objective value, and issues its error or deviation count value $\Delta C_n(t) = C_s(t) = C_n(t)$ as a control action signal. (ID) is a constant deviation integration calculation which corresponds to the transfer functions and 1/s in FIG. 1. It integrates the value of Cn(t) each time on renewing n, and reflects, in the control of the motor in a following n+1, $\tau n + 1$ concerning $\Delta C_n(t)$ in the feed back n. Each of the counted results $\tau_{n+1}$ is expressed as $\tau n+1 = \tau n + \alpha C_n(t)$. (AT) is a triggering time calculator corresponding to a point to be added with a path in parallel to the factor composed of the transfer functions and 1/s receiving the deviation signal $\Delta C_n(s)$ in FIG. 1. It calculates triggering time "tn+1" by the formula "tn+1 = {$\tau n + 1 + \Delta C_n(t)$}tp" together with the addition in reference to a clock period. In the above formula, tp is a period of the clock (CL) which oscillates with a predetermined period ($10^{-4}$ seconds in the instant embodiment) and transforms the counted value to time. The triggering time calculator (AT) is provided with a power source synchronizing circuit (TC) for controlling triggering phase in synchronism with an AC power source with respect to the driving circuit (DV) for the motor (M). The circuit (TC) detects 0 potential where time t of wave form of the electric power source to be fullwave rectified is 0, $\pi$, $2\pi$. It determines each of the detecting points to be a starting point and makes an ignition time by obtaining, from a result of calculation of "tn+1", time tm from the detecting point, e.g., t=0 from the starting point.

With reference to the flow charts of FIG. 5, when actuating the control power source, the relative controls are started. The output signal $\tau_0$ of the error integrator (ID) is set optionally at an initial setting. The output $t_0$ of the ignition time calculator (AT) is $t_0 = \tau_0 tp$, and triggers at the point tm from the point 0 which is a first 0 potential of the power source voltage. The driving device (DV) supplies the control voltage to the motor (M). Thereby, the rotation period $f_{Mn}$ of the motor is defined when n=0 to be $f_{M0}$. Since the signal Cn(t) showing the period of rotation of the motor is larger than the signal Cs(t) showing a designated objective rotation period, the triggering angle is increased. The rotation detector (DR) detects frequency $f_{M0}$ in proportion to the rotation speed. The rotation period calculator (SR) calculates the period $T_0 = 1/f_{M0}$, and the detection of the period is finished at this period $T_0$, then the AND gate obtains the feed back output $C_0(t) = fsT_0$ and inputs the same to the comparator (COMP). The comparator (COMP) receives the signal Cs(t) of the objective value at the other input, and calculates the error or deviation from the signal Cs(t), i.e., $\Delta C_0(t) = Cs(t) - C_0(t)$. This will be negative value. The error integrator (ID) obtains the integrated value $\tau_1 = \tau_0 + \alpha \Delta C_0(t)$. The triggering time calculator (AT) obtains the triggering time $t_1 = \{\tau_1 + \Delta C_0(t)\}$. The time $t_1$ is an output value of a control in an initial set $tm = \tau_0 tp$ of the integrated value $\tau_1$, that is, an addition of $\alpha \Delta t_0$ and $\Delta t_0$ to tm. The rotation period calculator (ST) carries out the calculation of "n←n+1", and repeats the detection of rotation and the integration, and renews the calculated results. When the triggering time calculator (AT) detects 0 potential of the AC power source, the program shifts to an interruption control (INT). The triggering time calculator (AT) is provided with a timer counter. However, if the counter detects the 0 potential it is reset, and loads the value of the integrated value $\{\tau_1 + \Delta C_0(t)\}$ and starts subtraction and returns to the point of interruption. The subtraction is carried out at the speed of the period 1/tp, and when the timer counter is 0, the program of the calculator (AT) shifts to the time interruption (T.INT). The time from strat of this subtraction to 0 is tm, and then the triggering signal is output to the driving circuit (DV) and the program returns to the occurrence of the interruption. If the signal Cn(t) shows the period of the motor to be smaller than the objective value Cs(t), then the deviations $\alpha \Delta t_n$, $\Delta t_n$ are positive thus increasing the triggering angle and the speed of the motor (M). When the signal Cn(t) exceeds the objective value so that the deviations are of negative values, it decreases the triggering angle so that the deviations are converged to 0. The program may be controlled by a microcomputer.

The driving circuit (DV) in FIG. 4 phase-controls the full wave control voltage to drive the motor (M). The calculator (AT) performs unit division by the time T, and resets as mentioned above the timer counter of the calculator and the actuation of the driving circuit (DV) for each of the divisions. It gives the time tm by the same control as mentioned above to the driving circuit DV. The DI portion will be detailed below.

The error count value $\Delta C_n(t)$ is determined on the basis of the set count value $C_s(t)$ and the feedback output value $C_n(t)$ as follows:

$$\Delta C_n(t) = C_s(t) - C_n(t) \tag{9}$$

This value $\Delta C_n(t)$ is input to the DI portion.

A discriminator DI1 has the function of changing-over the contacts of the switch SW in dependence on the magnitude of the differentiated error count value $\beta \Delta C_n(t)$ at the output of a differentiator DI2.

In a case where the differentiated value is equal to or greater than a certain reference value, the switch SW is changed-over from the contact A to the contact B, and in a case where it is smaller than the reference value, the contact B is changed-over to the contact A.

The differentiator DI2 calculates the differentiated error count value as follows: From Eq. (9), $$\Delta C_n(t) = \Delta C_n(t) - \Delta C_n + 1(t) \tag{10}$$

$$\beta = \Delta C_n(t)/K_z \tag{11}$$

where $K_z$ = constant
From Eqs. (10) and (11), $$\beta \Delta C_n(t) = \Delta C_n(t)/K_z \cdot \{\Delta C_n + 1(t) - \Delta C_n(t)\} \tag{12}$$

A case where a sudden and large load is applied at the steady-state value of the r.p.m. of the motor, will be described below with reference to FIG. 5 and FIGS. 6(a) and 6(b).

When a sudden and large load fluctuation arises in the steady state at a triggering time $t_m$, $$\Delta C_n(t) \geq K_1 \, t_m \tag{13}$$

holds. Therefore, calculations at a part A in FIG. 5 are executed. According to:

$$t_m 32 \, t_n + 1 = \{\tau_n + 1 + B_n\} t_p \tag{14}$$

the following holds for a range $t_1 < t < t_2$ in FIG. 6(b):

$$t_m = \{\tau_n + 1 + \alpha \beta \Delta C_n(t)\} t_p \tag{15}$$

and the following holds for $t_2 < t$:

$$t_m = \{\tau_n + 1 + \alpha \Delta C_n(t)\} t_p \tag{16}$$

Thus, the r.p.m. of the motor is controlled as indicated by a curve B in FIG. 6(b), and a speed control having the desired level characteristic is realized.

In the prior-art control, Eq. (15) mentioned above is not included, and Eq. (16) is relied on at all times. Therefore, when the sudden and large load is applied at the time $t_1$ (as regards a sewing machine, when a needle penetrates cloth), the triggering time $t_m$ is controlled so as to become smaller and comes closer to its original value.

The load suddenly lightens at the time $t_2$ (as regards the sewing machine, after the needle has penetrated the cloth), but the target r.p.m. is not established yet, and hence, the ignition time $t_m$ becomes still smaller.

At a time $t_3$, the ignition time becomes the maximum ignition, so that the motor is controlled as indicated by a curve A in FIG. 6(b).

As described above, according to the present invention, a speed control apparatus for an electric motor has the function of changing-over transfer functions 130 $\alpha/S$ and $1 + \alpha\beta$ by the use of calculating units such as a differential unit (DI), an error integrator (ID) and an ignition time calculator (AT) which can be realized by comparatively simple arrangements, whereby the motor can be subjected to a high-precision and stable speed control against various disturbances.

What is claimed is:

1. A speed control apparatus for an electric motor, comprising means to convert a rotating speed of the motor into a count value, a comparator which compares the count value produced by the conversion means and a count value conforming to a speed designation so as to produce an error count value, differential means to differentiate the error count value of said comparator every predetermined time and to change-over transfer functions dependency on a predetermined magnitude of the differentiated error count value, an error integrator which integrates either the error count value or the differentiated error count value every predetermined time, and a calculating unit which converts the sum of the error count value and the integrated error count value into a time value for controlling a power source for operating the motor.

2. A speed control apparatus for an electric motor as defined in claim 1, wherein said differential means comprises a differentiator which differentiates the error count value of said comparator, a discriminator which generates a control signal depending on the magnitude of the differentiated error count value, and a change-over switch controlled by said control signal of the discriminator to apply either the error count value or the differentiated error count value to said error integrator.

3. A speed control apparatus for an electric motor, comprising means to convert a rotating speed of the motor into a count value; a comparator which compares the count value produced by the conversion means and a count value conforming to a speed designation so as to produce an error count value; a differential unit including a differentiator for differentiating the error count value of said comparator every predetermined time and producing a differentiated error count value, a discriminator for producing a first signal when said differentiated error count value is greater than a predetermined reference value and a second signal when said differentiated error count value is smaller than the predetermined reference value, and a switch responsive to said first signal to apply said differentiated error count value to an output of said differential unit and responsive to said second signal to apply said error count value of the comparator to said output of the differential unit; means for integrating values at said output of the differential unit every predetermined time to produce an integrated value; means for adding said count error value of the comparator to said integrated value to produce a sum value; and means for converting said sum value into a time value for controlling a power source for operating said electric motor.

* * * * *